United States Patent
Okada et al.

[11] Patent Number: 6,071,992
[45] Date of Patent: Jun. 6, 2000

[54] FLAME-RETARDANT THERMOPLASTIC RESIN COMPOSITION

[75] Inventors: Koji Okada; Yutaka Maeda; Ryoichi Motoshige; Masahiko Noro, all of Tokyo, Japan

[73] Assignee: Techno Polymer Co., Ltd., Tokyo, Japan

[21] Appl. No.: 09/235,276

[22] Filed: Jan. 22, 1999

[51] Int. Cl.$^7$ .......................... C08K 3/32
[52] U.S. Cl. .................. 524/139; 524/141; 524/125; 524/127; 524/537; 524/565; 525/242
[58] Field of Search .................. 524/537, 139, 524/556, 571, 575, 577, 579, 558, 141, 143, 125, 127; 525/242

[56] References Cited

U.S. PATENT DOCUMENTS

| | | | |
|---|---|---|---|
| 5,061,745 | 10/1991 | Wittmann et al. | |
| 5,204,394 | 4/1993 | Gosens et al. | |
| 5,886,097 | 3/1999 | Fukumoto et al. | 525/66 |
| 5,900,446 | 5/1999 | Nishihara | 524/127 |
| 5,952,408 | 9/1999 | Lee et al. | 524/127 |

FOREIGN PATENT DOCUMENTS

| | | |
|---|---|---|
| 0 096 301 | 12/1983 | European Pat. Off. |
| 43 09 142 A1 | 9/1994 | Germany |

OTHER PUBLICATIONS

*Principle of Polymerization*, 3rd Ed., Odian, Wiley–Intersciences, p. 479, 1991.

*Primary Examiner*—Robert Dawson
*Assistant Examiner*—Kuo-Liang Peng
*Attorney, Agent, or Firm*—Nixon & Vanderhye

[57] ABSTRACT

The present invention relates to a flame-retardant thermoplastic resin composition comprising the following components (A) to (D):

(A) 50 to 80 parts by weight of an aromatic polycarbonate resin;

(B) 5 to 40 parts by weight of a rubber-reinforced thermoplastic resin prepared by graft-polymerizing monomer components comprising an aromatic vinyl monomer, a vinylcyanide monomer and optionally other copolymerizable vinyl-based monomers, with a rubber polymer, the amount of said vinylcyanide monomer used being not less than 0.5% by weight and less than 5% by weight based on the total weight of said monomer components;

(C) 5 to 30 parts by weight of phosphate represented by the formula (I):

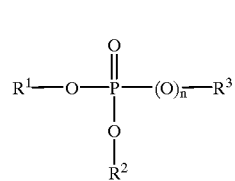

wherein $R^1$ to $R^3$ are the same or different and are independently an alkyl group having 1 to 10 carbon atoms or an aryl group having 6 to 20 carbon atoms; and n is 0 or 1, the total amount of the (A), (B) and (C) components being 100 parts by weight; and (D) 0.02 to 3 parts by weight of polytetrafluoroethylene based on the total weight of the (A), (B) and (C) components.

9 Claims, No Drawings

FLAME-RETARDANT THERMOPLASTIC RESIN COMPOSITION

BACKGROUND OF THE INVENTION

The present invention relates to an excellent flame-retardant thermoplastic resin composition, and more particularly, it relates to a thermoplastic resin composition having an excellent flame-retardant property, comprising an aromatic polycarbonate resin, a rubber-reinforced thermoplastic resin, a phosphate-based flame retardant and polytetrafluoroethylene, and capable of producing a molded product which is excellent in physical properties and flame-retardant property.

Hitherto, in many literatures and patents, there have been described resin compositions comprising polycarbonate resin and rubber-reinforced thermoplastic resin such as ABS resins Also, there has been proposed a mixture prepared by mixing phosphate with a resin composition comprising polycarbonate resin and ABS resin. In particular, in U.S. Pat. No. 5,061,745, etc., there have been proposed such resin compositions prepared by mixing the resin composition comprising polycarbonate resin and ABS resin with triphenyl phosphate and polytetrafluoroethylene, or the like.

However, these resin compositions have such a significant problem that a metal mold used upon injection-molding of the resin compositions is stained or contaminated by blooming of phosphate, because the phosphate has a low boiling point.

As one method for preventing the metal mold from being stained, it has been considered to increase the boiling point of phosphate itself by using such a phosphate having a high molecular weight. Such a method has been described, e.g., in NL 8802346 (corresponding to U.S. Pat. No. 5,204,394).

However, since the cost required for producing such high-molecular weight phosphates is considerably high, it has been strongly demanded to provide a method capable of preventing the metal mold from being stained without increase in costs of raw materials. Accordingly, there has been now strongly demanded a method of inhibiting the blooming of phosphate even when inexpensive low-molecular weight phosphates such as triphenyl phosphate are used.

As a result of the present inventors earnest studies, it has been found that by adjusting a composition ratio of vinylcyanide in constituting unit of a rubber-reinforced thermoplastic resin (ABS resin) to not less than 0.5% by weight and less than 5% by weight, the flowability of the melted resin composition can be improved and the molding temperature can be considerably reduced, so that the blooming of phosphate is reduced and the contamination of mold can be inhibited. The present invention has been attained on the basis of the above finding.

SUMMARY OF THE INVENTION

It is an object of the present invention to provide a flame-retardant thermoplastic resin composition which comprises a polycarbonate resin, a rubber-reinforced thermoplastic resin, phosphate and polytetrafluoroethylene, and is excellent in flame-retardant property, impact resistance, heat resistance, moldability and mold-stain resistance.

In an aspect of the present invention, there is provided a flame-retardant thermoplastic resin composition comprising the following components (A) to (D):

(A) 50 to 80 parts by weight of an aromatic polycarbonate resin;

(B) 5 to 40 parts by weight of a rubber-reinforced thermoplastic resin prepared by graft-polymerizing monomer components comprising an aromatic vinyl monomer, a vinylcyanide monomer and optionally other copolymerizable vinyl-based monomers, with a rubber polymer, the amount of said vinylcyanide monomer used being not less than 0.5% by weight and less than 5% by weight based on the total weight of said monomer components;

(C) 5 to 30 parts by weight of phosphate represented by the formula (I):

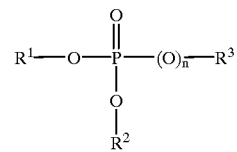

wherein $R^1$ to $R^3$ are the same or different and are independently an alkyl group having 1 to 10 carbon atoms or an aryl group having 6 to 20 carbon atoms; and n is 0 or 1, the total amount of the (A), (B) and (C) components being 100 parts by weight; and (D) 0.02 to 3 parts by weight of polytetrafluoroethylene based on the total weight of the (A), (B) and (C) components.

DETAILED DESCRIPTION OF THE INVENTION

As the aromatic polycarbonate resins (A) (component (A)) used in the present invention, there may be exemplified those prepared by reacting various dihydroxyaryl compounds with phosgene (phosgene method), those prepared by subjecting a dihydroxyaryl compound and diphenyl carbonate to ester-exchange reaction (ester-exchange method), or the like.

As the dihydroxyaryl compounds used as a raw material of the aromatic polycarbonate resin, there may be exemplified bis(4-hydroxyphenyl)methane, 1,1'-bis(4-hydroxyphenyl)ethane, 2,2'-bis(4-hydroxyphenyl)propane, 2,2'-bis(4-hydroxyphenyl)butane, 2,2'-bis(4-hydroxyphenyl)octane, bis(4-hydroxyphenyl)phenylmethane, 2,2'-bis(4-hydroxy-3-methylphenyl)propane, 2,2'-bis(4-hydroxy-3-tert-butylphenyl)propane, 2,2'-bis(4-hydroxy-3-bromophenyl)propane, 2,2'-bis(4-hydroxy-3,5-dichlorophenyl)propane, 1,1'-bis(4-hydroxyphenyl)cyclopentane, 1,1'-bis(4-hydroxyphenyl)cyclohexane, 4,4'-dihydroxydiphenyl ether, 4,4'-dihydroxy-3,3'-dimethyldiphenyl ether, 4,4'-dihydroxyphenyl sulfide, 4,4'-dihydroxy-3,3'-dimethylphenyl sulfide, 4,4'-dihydroxydiphenyl sulfoxide, 4,4'-dihydroxyphenyl sulfoxide, 4,4'-dihydroxy-3,3'-dimethyldiphenyl sulfoxide, 4,4'-dihydroxydiphenyl sulfone, 4,4'-dihydroxy-3,3'-dimethyldiphenyl sulfone, hydroquinone, resorcin, or the like. These dihydroxyaryl compounds may be used singly or in the form of a mixture of any two or more thereof. Among these dihydroxyaryl compounds, 2,2'-bis(4-hydroxyphenyl)propane, namely bisphenol A, is especially preferred.

The viscosity-average molecular weight of the aromatic polycarbonate resin (A) is preferably 15,000 to 40,000, more preferably 17,000 to 35,000, still more preferably 18,000 to 30,000.

The amount of the aromatic polycarbonate resin (A) blended is 50 to 80 parts by weight, preferably 55 to 75 parts by weight, more preferably 60 to 70 parts by weight based on 100 parts by weight of the (A) to (C) components. When the amount of the aromatic polycarbonate resin (A) is less than 50 parts by weight, the resultant resin composition may not be well-balanced between heat resistance and flame-retardant property. On the other hand, when the amount of the aromatic polycarbonate resin (A) is more than 80 parts by weight, the moldability (fluidity) of the resin composition may be deteriorated.

The rubber-reinforced thermoplastic resin (B) (component (B)) used in the resin composition according to the present invention, can be produced by graft-polymerizing monomer components comprising an aromatic vinyl monomer, a vinylcyanide monomer and optionally other vinyl-based monomers copolymerizable with these monomers, with a rubber polymer. Alternatively, the rubber-reinforced thermoplastic resin (B) may contain polymers or copolymers produced by polymerizing or copolymerizing the above-mentioned monomers with each other.

As the rubber polymers used for the production of the rubber-reinforced thermoplastic resin (B), there may be exemplified polybutadiene, polyisoprene, butyl rubber, styrene-butadiene copolymers (styrene content: preferably 5 to 60% by weight), styrene-isoprene copolymers, acrylonitrile-butadiene copolymers, ethylene-α-olefin-based copolymers, ethylene-α-olefin-polyene copolymers, silicone rubber, acrylic rubber, butadiene-(meth)acrylate copolymers, styrene-butadiene block copolymers, styrene-isoprene block copolymers, hydrogenated styrene-butadiene block copolymers, hydrogenated butadiene-based polymers, ethylene-based ionomers, or the like.

The above-mentioned styrene-butadiene block copolymers and styrene-isoprene block copolymers may include those having structures such as AB-type, ABA-type, a tapered type or a radial teleblock type.

Further, as the hydrogenated butadiene-based polymers, there may also be used, in addition to hydrogenated products of the above-mentioned block copolymers, hydrogenated products of block copolymers comprising styrene block and styrene-butadiene random copolymer, hydrogenated products of polymers comprising polybutadiene blocks having 1,2-vinyl bonds in an amount of not more than 20% by weight and polybutadiene blocks having 1,2-vinyl bonds in an amount of more than 20% by weight, or the like.

These rubber polymers may be used singly or in the form of a mixture of any two or more thereof.

As the aromatic vinyl monomers used as the monomer components in the production of the rubber-reinforced thermoplastic resin (B), there may be exemplified styrene, t-butylstyrene, α-methylstyrene, p-methylstyrene, divinylbenzene, 1,1-diphenylstyrene, N,N-diethyl-p-aminoethylstyrene, N,N-diethyl-p-aminomethylstyrene, vinylpyridine, vinylxylene, monochlorostyrene, dichlorostyrene, monobromostyrene, dibromostyrene, fluorostyrene, ethylstyrene, vinyl naphthalene, or the like. Among these aromatic vinyl monomers, styrene and α-methyl styrene are especially preferred. These aromatic vinyl monomers may be used singly or in the form of a mixture of any two or more thereof. The amount of the aromatic vinyl monomer used is preferably 60 to 99.5% by weight, more preferably 65 to 99.5% by weight, still more preferably 70 to 99.5% by weight based on the total weight of the monomer components. When the amount of the aromatic vinyl monomer is less than 60% by weight, the resultant resin composition may not show a sufficient moldability. On the other hand, when the amount of the aromatic vinyl monomer is more than 99.5% by weight, the resultant resin composition may be deteriorated in impact resistance and flame-retardant property.

As the above-mentioned vinylcyanide monomers, there may be exemplified acrylonitrile, methacrylonitrile or the like. The amount of the vinylcyanide monomer used is not less than 0.5% by weight and less than 5% by weight, preferably 0.5 to 4.5% by weight, more preferably 1 to 4% by weight based on the total weight of the monomer components. When the amount of the vinylcyanide monomer used is less than 0.5% by weight, the resultant resin composition may be deteriorated in impact resistance and flame-retardant property. On the other hand, when the amount of the vinylcyanide monomer used is more than 5% by weight, the resultant resin composition may be deteriorated in flame-retardant property, moldability and mold-stain resistance.

In addition, as the other copolymerizable vinyl-based monomers optionally usable together with the above-mentioned monomer components, there may be exemplified acrylates such as methylacrylate, ethylacrylate, propylacrylate, butylacrylate, aminoacrylate, hexylacrylate, octylacrylate, 2-ethylhexylacrylate, cyclohexylacrylate, dodecylacrylate, octadecylacrylate, phenylacrylate or benzylacrylate; methacrylates such as methyl methacrylate, ethylmethacrylate, propylmethacrylate, butylmethacrylate, aminomethacrylate, hexylmethacrylate, octylmethacrylate, 2-ethylhexylmethacrylate, cyclohexylmethacrylate, dodecylmethacrylate, octadecylmethacrylate, phenylmethacrylate or benzylmethacrylate; unsaturated acid anhydrides such as maleic anhydride, itaconic anhydride or citraconic anhydride; unsaturated acids such as acrylic acid or methacrylic acid; imide compounds of α,β-unsaturated dicarboxylic acids such as maleimide, N-methyl maleimide, N-butyl maleimide, N-(p-methylphenyl)maleimide, N-phenyl maleimide or N-cyclohexyl maleimide; epoxy-containing unsaturated compounds such as glycidylmethacrylate or allylglycidylether; unsaturated carboxamides such as acrylamide or methacrylamide; amino-containing unsaturated compounds such as acrylamine, aminomethyl methacrylate, aminoethyl methacrylate, aminopropyl methacrylate or aminostyrene; hydroxy-containing unsaturated compounds such as 3-hydroxy-1-propene, 4-hydroxy-1-butene, cis-4-hydroxy-2-butene, trans-4-hydroxy-2-butene, 3-hydroxy-2-methyl-1-propene, 2-hydroxyethylacrylate, 2-hydroxyethylmethacrylate or hydroxystyrene; oxazoline group-containing unsaturated compounds such as vinyloxazoline; or the like. Among these copolymerizable vinyl-based monomers, N-phenylmaleimide, maleic anhydride, butylacrylate, methylacrylate, hydroxyethylmethacrylate and glycidylmethacrylate are preferred. The amount of the copolymerizable vinyl-based monomer used is preferably not more than 30% by weight, more preferably not more than 20% by weight based on the total weight of the monomer components.

Incidentally, from the standpoints of melt viscosity and impact resistance, the amount of the rubber polymer used in the rubber-reinforced thermoplastic resin (B) is preferably 5 to 60% by weight, more preferably 7 to 50% by weight, still more preferably 10 to 40% by weight based on the weight of the rubber-reinforced thermoplastic resin (B). Also, from the standpoints of melt viscosity and impact resistance, the average particle size of rubber polymer particles dispersed in the rubber-reinforced thermoplastic resin (B) is preferably 0.05 to 2 $\mu$m, more preferably 0.1 to 1.5 $\mu$m, still more preferably 0.15 to 1 $\mu$m.

Meanwhile, the molecular weight of the rubber-reinforced thermoplastic resin (B) is determined such that the specific viscosity $\eta_{sp}$ (25° C. in DMF) of its components soluble in methyl ethyl ketone (MEK) as a matrix thereof is preferably 0.01 to 1.0, more preferably 0.03 to 0.5, still more preferably 0.05 to 0.3. When the specific viscosity is less than 0.01, the resultant resin composition may be deteriorated in impact resistance and flame-retardant property. On the other hand, when the specific viscosity is more than 1.0, the resultant resin composition may be deteriorated in moldability.

The above specific viscosity can be readily controlled by varying kinds and amounts of polymerization initiators, chain transfer agents, emulsifiers, solvents or the like as well as polymerization time and temperature.

The grafting ratio (graft percentage) of the rubber-reinforced thermoplastic resin (B) is preferably 10 to 350% by weight, more preferably 20 to 300% by weight. When the graft percentage is less than 10% by weight, the obtained molded product may be deteriorated in surface appearance. On the other hand, when the graft percentage is more than 350% by weight, the resultant resin composition may be deteriorated in flame-retardant property.

Specific examples of the rubber-reinforced thermoplastic resins (B) may include acrylonitrile-butadiene rubber-styrene copolymer (ABS resin), methyl methacrylate-acrylonitrile-butadiene rubber-styrene copolymer (MABS resin), acrylonitrile-acrylic rubber-styrene copolymer (AAS resin), acrylonitrile-EPDM (ethylene-propylene-diene terpolymer)-styrene copolymer (AES resin), acrylonitrile-silicone rubber-styrene copolymer (ASiS resin), mixtures of these copolymers, or the like. The amount of acrylonitrile used in monomer components other than rubber components is usually not less than 0.5% and less than 10% by weight.

The amount of the rubber-reinforced thermoplastic resin (B) blended in the resin composition according to the present invention, is 5 to 40 parts by weight, preferably 10 to 35 parts by weight, more preferably 15 to 30 parts by weight based on 100 parts by weight of the (A) to (C) components. When the amount of the rubber-reinforced thermoplastic resin (B) blended is less than 5 parts by weight, the resin composition may not be well-balanced between heat resistance and moldability. On the other hand, when the amount of the rubber-reinforced thermoplastic resin (B) blended is more than 40 parts by weight, the resin composition may not be well-balanced between flame-retardant property and impact resistance.

The rubber-reinforced thermoplastic resin (B) can be produced by subjecting the above-mentioned monomer components to radical graft polymerization in the presence of the rubber polymer by emulsion polymerization method, suspension polymerization method, solution polymerization method or mass polymerization method, thereby grafting the monomer components onto the rubber polymer. Among these polymerization methods, the emulsion polymerization method is preferred.

In the case where the grafting is carried out by emulsion polymerization method, there may also be used a polymerization initiator, an emulsifier, water or the like.

Upon the production of the rubber-reinforced thermoplastic resin (B), the monomer components may be added either at onece, partially or continuously, in the presence of a whole amount of the rubber polymer and then polymerized with each other. Also, these monomer-adding methods may be used in combination for the polymerization. Alternatively, a whole or a part of the rubber polymer may be added in the course of the polymerization.

As the polymerization initiators, there may be used preparations comprising organic hydroperoxides, typically, cumene hydroperoxide, diisopropylbenzene hydroperoxide or paramenthane hydroperoxide, and sugar-containing pyrophosphoric acid; redox-type preparations combined with reducing agents, typically, sulfoxylate; persulfides; peroxides such as azo-bis-isobutylonitrile or benzoylperoxide; or the like.

As the emulsifiers, there may be used anionic surfactants, nonionic surfactants or amphoteric surfactants. Specific examples of the anionic surfactants may include higher-alcohol sulfuric acid esters, alkylbenzene sulfonates, fatty acid sulfonates, phosphoric acid-based surfactants, fatty acid esters or the like. Specific examples of the nonionic surfactants may include ordinary nonionic surfactants such as polyethylene glycol alkyl esters, alkyl ethers or alkylphenyl ethers, or the like. Specific examples of the amphoteric surfactants may include those containing as anion moieties carboxylates, sulfates, sulfonates, phosphates, etc., and containing as cation moieties, amine salts, quaternary ammonium salts, etc.

Incidentally, the rubber-reinforced thermoplastic resin (B) may be produced by subjecting the monomer components and the rubber polymer to emulsion polymerization at a temperature of usually 10 to 120° C., preferably 30 to 110° C.

The phosphates (C) used in the present invention are the compounds represented by the formula (I):

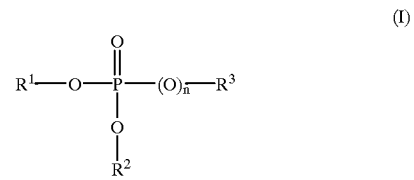

wherein $R^1$ to $R^3$ are the same or different and are independently an alkyl group having 1 to 10 carbon atoms or an aryl group having 6 to 20 carbon atoms; and n is 0 or 1.

Specific examples of the phosphates (C) represented by the formula (I) may include triphenyl phosphate, crezyldiphenyl phosphate, tricrezyl phosphate, trixylyl phosphate, crezyldiphenyl phosphate, trihydroxyphenyl phosphate, trimethyl phosphate, tert-butylphenyl diphenyl phosphate or the like.

The amount of the phosphate (C) blended is 5 to 30 parts by weight, preferably 5 to 25 parts by weight, more preferably 5 to 22 parts by weight based on 100 parts by weight of the (A) to (C) components. When the amount of the phosphate (C) blended is less than 5 parts by weight, flame-retardant property may not be imparted to the resin composition. On the other hand, when the amount of the phosphate (C) blended is more than 30 parts by weight, the heat resistance of the obtained resin composition may be considerably deteriorated.

As the polytetrafluoroethylene (D), there may be exemplified a homopolymer of tetrafluoroethylene or copolymers of tetrafluoroethylene with vinylidene fluoride, hexafluoropropylene or the like. Among them, the tetrafluoroethylene homopolymer is preferred. The polytetrafluoroethylenes (D) may be produced by known polymerization methods such as emulsion polymerization method or suspension polymerization method.

The amount of the polytetrafluoroethylene (D) blended is 0.02 to 3 parts by weight, preferably 0.05 to 2 parts by weight, more preferably 0.08 to 1 part by weight based on 100 parts by weight of the (A) to (C) components. When the amount of the polytetrafluoroethylene (D) blended is less than 0.02 part by weight, the obtained resin composition may be deteriorated in flame-retardant property. On the other hand, when the amount of the polytetrafluoroethylene (D) blended is more than 3 parts by weight, the resultant resin composition may be considerably deteriorated in processability upon extrusion for the pelletization thereof.

The flame-retardant thermoplastic resin composition according to the present invention may further contain a flame-retardant assistant.

As the flame-retardant assistants, there may be exemplified antimony trioxide, antimony tetraoxide, antimony pentaoxide, iron oxide, chlorinated propylene, melamine, melamine cyanurate, polyphosphoric acid melamine, polyorganosiloxane-based polymers or the like. These flame-retardant assistants may be used singly or in the form of a mixture of any two or more thereof. The amount of the flame-retardant assistant used is usually 0.05 to 10 parts by weight based on 100 parts by weight of the (A) to (C) components.

The flame-retardant thermoplastic resin composition according to the present invention may further contain fillers in order to enhance mechanical properties thereof. Examples of such fillers may include glass fibers, carbon fibers, metal fibers, metal flakes, glass beads, wollastonite, glass milled fibers, rock fillers, glass flakes, calcium carbonate, talc, mica, kaolin, barium sulfate, graphite, molybdenum disulfide, magnesium oxide, zinc oxide, zinc oxide whiskers, potassium titanate whiskers, glass balloons or ceramic balloons, or the like. These fillers may be used singly or in the form of a mixture of any two or more thereof.

Among these fillers, as the preferred glass fibers or carbon fibers, there may be exemplified those having a fiber diameter of 6 to 60 $\mu$m and a fiber length of not less than 30 $\mu$m. These fillers may be used in an amount of usually 1 to 200 parts by weight based on 100 parts by weight of the resin composition according to the present invention.

Also, the flame-retardant thermoplastic resin composition according to the present invention may further contain known additives such as coupling agents, anti-fungus agents, mildew-proofing agents, anti-oxidants, weather-proofing (or sun-proofing) agents, plasticizers, colorants (pigments, dyes, etc.), lubricants, metal powder, silicone oil or the like.

The resin composition according to the present invention may be appropriately blended with other thermoplastic polymers, if necessary, in order to impart thereto various properties according to the applications thereof. Examples of the thermoplastic polymers may include polyethylene, polypropylene, polyamide resins, polyamide elastomers, thermoplastic polyesters such as polybutylene terephthalate or polyethylene terephthalate, polyester elastomers, liquid crystal polymers (LCP), polyphenylene sulfide (PPS), polysulfone, polyphenylene ether or the like.

Furthermore, the flame-retardant thermoplastic resin composition according to the present invention can be produced by mixing and kneading the respective raw components using various extruders, Banbury mixer, kneader, rolls, kneader ruder or the like. Among them, production methods using extruders or Banbury mixer are preferred. The kneading temperature is preferably 100 to 350° C., more preferably 150 to 300° C. Upon the kneading, the respective raw components may be mixed or kneaded at one time, or may be added in several separate parts while kneading sequentially. Also, the raw components may be added in multi-stages into an extruder and mixed or kneaded together therein. In addition, after mixing or kneading in Banbury mixer or kneader, the resultant mixture may be pelletized using an extruder.

The thus obtained flame-retardant thermoplastic resin composition according to the present invention may be formed into various molded products by injection-molding method, sheet-extrusion method, vacuum forming method, profile-extrusion method, foam-molding method, injection-press method, press-molding method, blow-molding method or the like.

The molded products obtained by the above-mentioned methods, may be used as parts, housings, chassises, trays or the like in various application fields such as office automation equipments or household electrical appliances, electric engineering or electronics, sundries, sanitary wares or automobiles.

As described above, the flame-retardant thermoplastic resin composition according to the present invention are excellent in and well-balanced between flame-retardant property, impact resistance, heat resistance, moldability and mold stain resistance, and therefore, can be used in extensive application fields.

EXAMPLES

The present invention is described in more detail with reference to the following examples, but the present invention is not restricted to those examples and various modifications are possible within the scope of the invention.

Incidentally, in the following Examples and Comparative Examples, "part(s)" and "%" represent "part(s) by weight" and "% by weight", respectively, unless otherwise specified. Further, various properties of resin compositions obtained in respective Examples and Comparative Examples, were measured and evaluated as follows.

Graft percentage:

(I) A predetermined amount (x) of a rubber-reinforced thermoplastic resin was added to methyl ethyl ketone, and the mixture was allowed to stand overnight. The mixture was then treated by an ultrasonic cleaner for 15 minutes, thereby completely dissolving liberated resin in the solvent. Thereafter, the resultant solution was centrifuged at 23,000 rpm for one hour using a centrifugal separator to separate soluble components therefrom. The thus obtained soluble components were subjected to evaporation to dryness, and then dried at 60° C. overnight using a vacuum drier, thereby obtaining a sample (A).

(II) The above centrifugal separation was repeated two times in the same manner as defined in (I), thereby obtaining insoluble components. The obtained insoluble components were dried at 60° C. overnight using a vacuum drier, thereby obtaining dried insoluble components (y).

The graft percentage was calculated according to the following formula:

Graft percentage (%)=[(y)−(x)×rubber ratio (R) of rubber-reinforced thermoplastic resin]×100/[(x)×rubber ratio (R) of rubber-reinforced thermoplastic resin]

Specific viscosity ($\eta_{sp}$):

0.100 g of the sample (A) was accurately weighed in a conical flask, and then 10.0 ml of DMF was added into the flask. The mixture was allowed to stand overnight to sufficiently dissolve the sample (A) in DMF. The viscosity of the obtained solution was measured at 25° C., and expressed by a ratio of the measured value to the viscosity of DMF solely.

Flammability (flame-retardant property):

According to the method prescribed in UL94 standard, a test specimen having a size of 5"×½"×⅒" was subjected to UL94 500W (125 mm) vertical combustion test. Incidentally, numerals in Tables represent total combustion time (second) of five samples, and the character "d" in Tables represents such a case where the test specimens were dripped off upon combustion thereof so that it was impossible to obtain 5 VB.

Impact resistance:

A notched test specimen having a thickness of ¼" was subjected to Izod impact test according to ASTM D256. The impact resistance was expressed by a unit of kgf·cm/cm.

Heat resistance (Heat distortion temperature):

The heat resistance was measured according to ASTM D648. The heat resistance was expressed by a unit of ° C.

Fluidity (moldability):

The fluidity was measured according to JIS K7210 (at 240° C. under a load of 10 kgf). The fluidity was expressed by a unit of gram/10 minutes.

Mold-stain resistance:

A mold capable of obtaining a mosquito-coil-like molded product (thickness: 2 mm and width: 20 mm) was set to a injection molding machine (IS-80A, mfd. by Toshiba Machine Co., Ltd.). The set temperature of a cylinder of a molding machine was varied (200–260° C.) to adjust a length of the mosquito-coil (flowing length of fluid in the mold) to a constant value of 150 mm, while maintaining a constant injection molding pressure (75 kg/cm$^2$). After conducting 100 molding operations successively, the deposited material at the portion within 150–170 mm in the molding was observed and the mold-stain resistance was evaluated by comparing with the amount of the deposited material. When the amount of the flame retardant deposited is large, the mold-stain resistance was evaluated as being "poor". Conversely, when the amount of the flame retardant deposited is small, the mold-stain resistance was evaluated as being "good".

The respective components used in Examples and Comparative Examples are described as follows.

(A) Aromatic polycarbonate resin:

"NOVAREX 7022PJ" produced by Mitsubishi Engineering-Plastics Corporation, was used as the aromatic polycarbonate resin.

(B) Preparation of rubber-reinforced thermoplastic resin:

30 parts (as solid content) of polybutadiene-based rubber latex having an average particle size of 0.30 μm, 30 parts of monomer components having a composition ratio (weight ratio) shown in Table 1, 1.6 parts of a 5% potassium hydroxide aqueous solution, 102 parts of deionized water and 0.53 part of disproportionated potassium rosinate soap were charged into a 5-liter reactor equipped with a stirrer, a heating and cooling apparatus and feeders for respective raw materials and assistants, and heated to 40° C. At the time when the temperature reached 40° C., an aqueous solution prepared by uniformly dissolving 0.23 part of sodium pyrophosphate, 0.29 part of dextrose and 0.0047 part of ferrous sulfate in 9.6 parts of deionized water, and 0.11 part of cumene hydroperoxide were added to the reactor. After completion of the addition, the contents of the reactor were heated to 75° C. for 1.5 hours. After 1.5 hours from the addition, an emulsified mixture prepared by mixing and stirring 40 parts of the monomer components having a composition ratio (weight ratio) shown in Table 1, 1.23 parts of disproportionated potassium rosinate soap, 0.2 part of t-dodecyl mercaptan, 0.8 part of a 5% potassium hydroxide aqueous solution and 38 parts of deionized water together, and 0.16 part of cumene hydroperoxide were continuously added to the reactor for 2 hours. After completion of the addition, an aqueous solution prepared by uniformly dissolving 0.08 part of sodium pyrophosphate, 0.10 part of dextrose and 0.0015 part of ferrous sulfate in 3.2 parts of deionized water, and 0.05 part of cumene hydroperoxide were added to the reactor. The contents of the reactor was allowed to stand for one hour, and then cooled to terminate the reaction.

An anti-aging agent was added to the obtained graft copolymer latex, and the latex was solidified by adding thereto a 0.2% sulfuric acid aqueous solution maintained at 90° C. The solidified product was washed with water, dehydrated and then dried, thereby obtaining a rubber-reinforced thermoplastic resin. The thus obtained rubber-reinforced thermoplastic resin was analyzed and measured with respect to graft percentage and specific viscosity thereof. The results are shown in Table 1.

TABLE 1

| Rubber-reinforced thermoplastic resins | Monomer components (parts) | | Graft percentage (%) | Specific viscosity ($\eta_{sp}$) |
|---|---|---|---|---|
| | Acrylonitrile | Styrene | | |
| B-1 | — | 100 | 35 | 0.039 |
| B-2 | 0.5 | 99.5 | 32 | 0.037 |
| B-3 | 1.0 | 99.0 | 43 | 0.037 |
| B-4 | 2.5 | 97.5 | 50 | 0.040 |
| B-5 | 4.0 | 96.0 | 80 | 0.045 |
| B-6 | 4.5 | 95.5 | 39 | 0.037 |
| B-7 | 6.0 | 94.0 | 70 | 0.038 |
| B-8 | 8.0 | 92.0 | 40 | 0.038 |
| B-9 | 10.0 | 90.0 | 85 | 0.038 |
| B-10 | 20.0 | 80.0 | 90 | 0.038 |
| B-11 | 25.0 | 75.0 | 80 | 0.047 |

(C) Phosphate:
  C-1: triphenyl phosphate;
  C-2: crezyl diphenyl phosphate
(D) Polvtetrafluoroethylene:
  "TEFLON 6CJ" produced by Mitsui DuPont Fluorochemical Co., Ltd., was used as the polytetrafluoroethylene.

Examples 1 to 7 and Comparative Examples 1 to 17

According to formulations shown in Tables 2 to 4, the respective components were mixed by a mixer for 3 minutes and melt-extruded into pellets using a 40 mmφ twin-screw extruder whose cylinder temperature was maintained at 180 to 240° C. The thus obtained pellets were injection-molded at a cylinder temperature of 240° C. and a mold temperature of 50° C., thereby obtaining test specimens for respective evaluations. The results of the evaluations using these test specimens are shown in Tables 2 to 4.

As is apparent from the results of Examples 1 to 7 shown in Table 2, the resin compositions according to the present invention were excellent in and well-balanced between flame-retardant property, impact strength, heat distortion temperature and moldability.

On the other hand, as is apparent from Tables 3 and 4, in Comparative Examples 4 and 16, since the amount of vinylcyanide monomer grafted was zero, the obtained resin compositions showed a low impact resistance and further a deteriorated flame-retardant property. Conversely, in Comparative Examples 1 to 3, 5 to 6 and 17, since the amount of vinylcyanide monomer grafted was too large, the obtained resin compositions showed a low moldability and were deteriorated in mold-stain resistance and flame-retardant property. In Comparative Example 7, since the amount of polycarbonate resin blended was too small, the obtained resin composition showed a low heat resistance. Conversely, in Comparative Example 8, since the amount of polycarbonate resin blended was too large, the obtained resin composition showed a low moldability and a deteriorated mold-stain resistance. In Comparative Example 9, since the amount of rubber-reinforced thermoplastic resin blended was too small, the obtained resin composition showed a low impact resistance. Conversely, in Comparative Examples 10 and 11, since the amount of rubber-reinforced thermoplastic resin blended was too large, the obtained resin compositions were deteriorated in flame-retardant property. In Comparative Example 12, since the amount of phosphate blended was too small, the obtained resin composition was deteriorated in flame-retardant property, moldability and mold-stain resistance. Conversely, in Comparative Example 13, since the amount of phosphate blended was too large, the obtained resin composition was deteriorated in heat resistance and impact resistance. In Comparative Example 14, since the amount of polytetrafluoroethylene blended was too small, the obtained resin composition was deteriorated in flame-retardant property. Conversely, in Comparative Example 15, since the amount of polytetrafluoroethylene blended was too large, it was difficult to extrude the obtained resin composition into pellets.

TABLE 2

| Example No. | | 1 | 2 | 3 | 4 | 5 | 6 | 7 |
|---|---|---|---|---|---|---|---|---|
| Formulation (parts) | | | | | | | | |
| Component (A) | Amount (parts) | 65 | 65 | 65 | 65 | 65 | 61 | 61 |
| Component (B) | Kind | B-2 | B-3 | B-4 | B-5 | B-6 | B-4 | B-4 |
| | Amount (parts) | 22 | 22 | 22 | 22 | 22 | 26 | 26 |
| Component (C) | Kind | C-1 | C-1 | C-1 | C-1 | C-1 | C-1 | C-2 |
| | Amount (parts) | 13 | 13 | 13 | 13 | 13 | 13 | 13 |
| Component (D) | Amount (parts) | 0.25 | 0.25 | 0.25 | 0.25 | 0.25 | 0.25 | 0.25 |
| Results of evaluations | | | | | | | | |
| Flame-retardant property (sec) | | 64 | 65 | 50 | 40 | 48 | 60 | 57 |
| Impact resistance (kgf cm/cm) | | 40 | 55 | 52 | 55 | 50 | 60 | 57 |
| Heat distortion temperature (° C.) | | 84 | 85 | 84 | 84 | 85 | 84 | 82 |
| Moldability (g/10 minutes) | | 154 | 152 | 154 | 149 | 145 | 179 | 180 |
| Mold-stain resistance | | Good | Good | Good | Good | Good | Good | Good |

TABLE 3

| Comparative Example No. | | 1 | 2 | 3 | 4 | 5 | 6 |
|---|---|---|---|---|---|---|---|
| Formulation (parts) | | | | | | | |
| Component (A) | Amount (parts) | 65 | 65 | 65 | 65 | 65 | 65 |
| Component (B) | Kind | B-7 | B-8 | B-9 | B-1 | B-10 | B-11 |
| | Amount (parts) | 22 | 22 | 22 | 22 | 22 | 22 |
| Component (C) | Kind | C-1 | C-1 | C-1 | C-1 | C-1 | C-1 |
| | Amount (parts) | 13 | 13 | 13 | 13 | 13 | 13 |
| Component (D) | Amount (parts) | 0.25 | 0.25 | 0.25 | 0.25 | 0.25 | 0.25 |
| Results of evaluations | | | | | | | |
| Flame-retardant property (sec) | | 51 | 63 | 48 | d | d | d |
| Impact resistance (kgf · cm/cm) | | 61 | 66 | 66 | 4 | 64 | 64 |
| Heat distortion temperature (° C.) | | 86 | 86 | 85 | 84 | 84 | 84 |
| Moldability (g/10 minutes) | | 126 | 113 | 116 | 152 | 105 | 106 |
| Mold-stain resistance | | Poor | Poor | Poor | Good | Poor | Poor |

TABLE 3-continued

| Comparative Example No. | | 7 | 8 | 9 | 10 | 11 | 12 |
|---|---|---|---|---|---|---|---|
| Formulation (parts) | | | | | | | |
| Component (A) | Amount (parts) | 40 | 85 | 70 | 40 | 25 | 65 |
| Component (B) | Kind | B-4 | B-4 | B-4 | B-4 | B-4 | B-4 |
| | Amount (parts) | 40 | 2 | 4 | 50 | 50 | 32 |
| Component (C) | Kind | C-1 | C-1 | C-1 | C-1 | C-1 | C-1 |
| | Amount (parts) | 20 | 13 | 26 | 10 | 25 | 3 |
| Component (D) | Amount (parts) | 0.25 | 0.25 | 0.25 | 0.25 | 0.25 | 0.25 |
| Results of evaluations | | | | | | | |
| Flame-retardant property (sec) | | d | 34 | 30 | d | d | d |
| Impact resistance (kgf · cm/cm) | | 5 | 15 | 10 | 62 | 8 | 86 |
| Heat distortion temperature (° C.) | | 68 | 87 | 75 | 70 | 62 | 91 |
| Moldability (g/10 minutes) | | 185 | 98 | 240 | 74 | 239 | 10 |
| Mold-stain resistance | | Good | Poor | Good | Poor | Good | Poor |

TABLE 4

| Comparative Example No. | | 13 | 14 | 15 | 16 | 17 |
|---|---|---|---|---|---|---|
| Formulation (parts) | | | | | | |
| Component (A) | Amount (parts) | 55 | 65 | 65 | 61 | 61 |
| Component (B) | Kind | B-4 | B-4 | B-4 | B-1 | B-11 |
| | Amount (parts) | 10 | 22 | 22 | 26 | 26 |
| Component (C) | Kind | C-1 | C-1 | C-1 | C-1 | C-1 |
| | Amount (parts) | 35 | 13 | 13 | 13 | 13 |
| Component (D) | Amount (parts) | 0.25 | 0.01 | 4.00 | 0.25 | 0.25 |
| Results of evaluations | | | | | | |
| Flame-retardant property (sec) | | d | d | 35 | d | d |
| Impact resistance (kgf · cm/cm) | | 3 | 55 | 49 | 5 | 60 |
| Heat distortion temperature (° C.) | | 63 | 85 | 85 | 84 | 83 |
| Moldability (g/10 minutes) | | 324 | 154 | 149* | 182 | 122 |
| | | | | Remarks: difficult to extrude | | |
| Mold-stain resistance | | Good | Good | Good | Good | Poor |

*difficult to make pellet by extrusion

What is claimed is:

1. A flame-retardant thermoplastic resin composition consisting essentially of the following components (A) to (D):

(A) 50 to 80 parts by weight of an aromatic polycarbonate resin;

(B) 5 to 40 parts by weight of a rubber-reinforced thermoplastic resin prepared by graft-polymerizing monomer components comprising an aromatic vinyl monomer, a vinylcyanide monomer and optionally other copolymerizable vinyl-based monomers, with a rubber polymer, the amount of said vinylcyanide monomer used being not less than 0.5% by weight and less than 5% by weight based on the total weight of said monomer components;

(C) 5 to 30 parts by weight of phosphate represented by the formula (I):

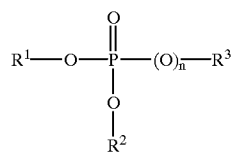

(I)

wherein $R^1$ to $R^3$ are the same or different and are independently an alkyl group having 1 to 10 carbon atoms or an aryl group having 6 to 20 carbon atoms; and n is 0 or 1,
the total amount of the (A), (B) and (C) components being 100 parts by weight; and
(D) 0.02 to 3 parts by weight of polytetrafluoroethylene based on the total weight of the (A), (B) and (C) components.

2. A flame-retardant thermoplastic resin composition according to claim 1, consisting essentially of:
55 to 75 parts by weight of the component (A);
10 to 35 parts by weight of the component (B);
5 to 25 parts by weight of the component (C), the total amount of the (A), (B) and (C) components being 100 parts by weight; and
0.05 to 2 part by weight of the component (D) based on the total weight of the (A), (B) and (C) components.

3. A flame-retardant thermoplastic resin composition according to claim 1, consisting essentially of:
60 to 70 parts by weight of the component (A);
15 to 30 parts by weight of the component (B);
5 to 22 parts by weight of the component (C), the total amount of the (A), (B) and (C) components being 100 parts by weight; and
0.08 to 1 part by weight of the component (D) based on the total weight of the (A), (B) and (C) components.

4. A flame-retardant thermoplastic resin composition according to claim 1, wherein the amount of said vinylcyanide monomer used in the monomer components is 0.5 to 4.5% by weight based on the total weight of the monomer components.

5. A flame-retardant thermoplastic resin composition according to claim 1, wherein the amount of said vinylcyanide monomer used in the monomer components is 1 to 4% by weight based on the total weight of the monomer components.

6. A flame-retardant thermoplastic resin composition according to claim 1, wherein the component (B) is at least one resin selected from the group consisting of acrylonitrile-butadiene-styrene copolymer, methyl methacrylate-acrylonitrile-butadiene rubber-styrene copolymer, acrylonitrile-acrylic rubber-styrene copolymer, acrylonitrile-(ethylene-propylene-diene terpolymer)-styrene copolymer, acrylonitrile-silicone rubber-styrene copolymer and mixtures of these copolymers, and the amount of acrylonitrile used is not less than 0.5% and less than 5% by weight based on the total weight of monomer components other than rubbers.

7. A flame-retardant thermoplastic resin composition according to claim 1, wherein said rubber-reinforced thermoplastic resin (B) is at least one resin selected from the group consisting of acrylonitrile-butadiene-styrene copolymer, methyl methacrylate-acrylonitrile-butadiene rubber-styrene copolymer, acrylonitrile-acrylic rubber-styrene copolymer and acrylonitrile-(ethylene-propylene-diene terpolymer)-styrene copolymer.

8. A flame-retardant thermoplastic resin composition according to claim 1, wherein said component (B) is acrylonitrile-butadiene-styrene copolymer.

9. A flame-retardant thermoplastic resin composition according to claim 1, wherein said phosphate (C) is at least one compound selected from the group consisting of triphenyl phosphate, crezyldiphenyl phosphate, tricrezyl phosphate, trixylyl phosphate, crezyldiphenyl phosphate, trihydroxyphenyl phosphate, trimethyl phosphate and tert-butylphenyl diphenyl phosphate.

* * * * *